(12) United States Patent
Ton

(10) Patent No.: US 6,771,623 B2
(45) Date of Patent: Aug. 3, 2004

(54) METHOD FOR ENSURING RELIABLE MOBILE IP SERVICE

(75) Inventor: Bobby That Dao Ton, Lachine (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 780 days.

(21) Appl. No.: 09/726,351

(22) Filed: Dec. 1, 2000

(65) Prior Publication Data

US 2002/0067704 A1 Jun. 6, 2002

(51) Int. Cl.$^7$ ................................................. H04Q 7/00
(52) U.S. Cl. ....................... 370/331; 370/401; 370/338; 455/433
(58) Field of Search ................................ 370/328, 331, 370/401, 338, 329, 216, 217, 221; 455/435, 433, 436, 453

(56) References Cited

U.S. PATENT DOCUMENTS

| | | | | |
|---|---|---|---|---|
| 6,195,705 B1 | * | 2/2001 | Leung | 709/245 |
| 6,466,964 B1 | * | 10/2002 | Leung et al. | 709/202 |
| 6,549,522 B1 | * | 4/2003 | Flynn | 370/313 |
| 6,560,217 B1 | * | 5/2003 | Peirce et al. | 370/351 |
| 6,636,498 B1 | * | 10/2003 | Leung | 370/338 |

FOREIGN PATENT DOCUMENTS

| | | |
|---|---|---|
| EP | 0 950 954 A1 | 10/1999 |
| EP | 1 058 421 A2 | 6/2000 |
| WO | WO 00/18154 | 3/2000 |
| WO | WO 00/18155 | 3/2000 |

* cited by examiner

Primary Examiner—Chau Nguyen
Assistant Examiner—Nittaya Juntima
(74) Attorney, Agent, or Firm—Jenkens & Gilchrist

(57) ABSTRACT

The present invention relates to data communications in packet switched networks and more specifically to the mobility of terminals in networks implementing the Mobile Internet Protocol (MIP). In the method according to the present invention each Home Agent will store locally the load information from other Home Agents and will exchange load information with the other Home Agents. The Mobile Node first attempts to register with its primary Home Agent. This registration is not completed due to e.g. failure of the primary Home Agent or where the network chooses to register with another Home Agent which has a lower load than the primary Home Agent. The Mobile Node then attempts to register with a second, alternate, Home Agent. If the alternate Home Agent accepts the request then the Mobile Node is able to access MIP services through the alternate Home Agent. The present invention provides a method to balance the load using dynamic load balancing and a method to recover from Home Agent failure using software Home Agent redundancy.

27 Claims, 5 Drawing Sheets

Software Redundancy by Mobile IP Secondary Home Agent Extension

METHOD FOR ENSURING RELIABLE MOBILE IP SERVICE

FIELD OF THE INVENTION

The present invention relates to data communications in packet switched networks and more specifically to the mobility of terminals in networks implementing the Mobile Internet Protocol (MIP).

RELATED ART

Typical IP networks are mainly developed for stationary terminals connected to the network by wired connections. Mobile terminals may be connected by use of base transceiver stations, but to achieve true mobility functions are required for handling e.g. roaming and handover in the network.

The Mobile-IP working group of the Internet Engineering Task Force (IETF) is currently working on a standard for Mobile IP. The main goals of the Mobile IP standard are that the system shall work within the TCP/IP protocol suite and provide Internet-wide mobility. The system shall also be transparent to higher layer protocols and allow hosts to keep their IP addresses as they migrate. In addition, no changes shall be required of non-mobile hosts and routers. It should be noted that a mobile terminal in this context does not necessarily mean a mobile terminal having a radio interface but a fixed terminal or user that changes its point of attachment from one fixed network to another.

An example of such an Internet-type mobility protocol is the IP mobility (IP=Internet Protocol), which is the topic of standards RFC2002 to RFC2004 and RFC2290 by the Internet Engineering Task Force (IETF). These RFC standards are incorporated herein by reference. In short, IP mobility is a mechanism for providing a mobile user with telecommunications capability using an IP address. It enables Mobile Nodes to change their points of attachment in the Internet without changing their IP address. Thus it facilitates the communication of a Mobile Node and a correspondent host with the Mobile Node's home address.

This Mobile IP protocol allows transparent routing of IP datagrams to Mobile Nodes in the Internet. Each Mobile Node is always identified by its home address, regardless of its current point of attachment to the Internet. While situated away from its home, a Mobile Node is also associated with a care-of address, which provides information about its current point of attachment to the Internet. The protocol provides for registering the care-of address with a Home Agent. The Home Agent sends datagrams destined for the Mobile Node through a tunnel to the care-of address. After arriving at the end of the tunnel, each datagram is then delivered to the Mobile Node.

The Mobile IP protocol introduces the following new functional entities: a Mobile Node, a Home Agent and a Foreign Agent. A Mobile Node is a host or router that changes its point of attachment from one network or sub-network to another. A Mobile Node may change its location without changing its IP address; it may continue to communicate with other Internet nodes at any location using its (constant) IP address, assuming link-layer connectivity to a point of attachment is available.

A Home Agent is a router on a Mobile Node's home network which tunnels datagrams for delivery to the Mobile Node when it is away from home, and maintains current location information for the Mobile Node. A Foreign Agent is a router on a Mobile Node's visited network which provides routing services to the Mobile Node while registered on that network. The Foreign Agent detunnels and delivers datagrams to the Mobile Node that were tunnelled by the Mobile Node's Home Agent. For datagrams sent by a Mobile Node, the Foreign Agent may serve as a default router for registered Mobile Nodes.

Each Mobile Node is given a long-term IP address on a home network. This home address is administered in the same way as a "permanent" IP address provided to a stationary host. When away from its home network, a "care-of address" is associated with the Mobile Node and reflects the Mobile Node's current point of attachment. The Mobile Node typically uses its home address as the source address of all IP datagrams that it sends.

The care-of address is the termination point of a tunnel toward a Mobile Node, for datagrams forwarded to the Mobile Node while it is away from home. The protocol can use two different types of care-of address: a "Foreign Agent care-of address" is an address of a Foreign Agent with which the Mobile Node is registered, and a "co-located care-of address" is an externally obtained local address which the Mobile Node has associated with one of its own network interfaces.

The Mobile IP protocol functions basically as follows: mobility agents (i.e., Foreign Agents and Home Agents) advertise their presence via Agent Advertisement messages. A Mobile Node may optionally solicit an Agent Advertisement message from any locally attached mobility agents through an Agent Solicitation message. A Mobile Node receives these Agent Advertisements and determines whether it is on its home network or a foreign network.

When the Mobile Node detects that it is located on its home network, it operates without mobility services. If returning to its home network from being registered elsewhere, the Mobile Node reregisters with its Home Agent, through exchange of a Registration Request and Registration Reply message. When a Mobile Node detects that it has moved to a foreign network, it obtains a care-of address on the foreign network. The care-of address can either be determined from a Foreign Agent's advertisements (a Foreign Agent care-of address), or by some external assignment mechanism.

The Mobile Node operating away from home then registers its new care-of address with its Home Agent through exchange of a Registration Request and Registration Reply message with it, possibly via a Foreign Agent. Datagrams sent to the Mobile Node's home address are then intercepted by its Home Agent, tunnelled by the Home Agent to the Mobile Node's care-of address, received at the tunnel endpoint (either at a Foreign Agent or at the Mobile Node itself), and finally delivered to the Mobile Node. In the reverse direction, datagrams sent by the Mobile Node are generally delivered to their destination using standard IP routing mechanisms, not necessarily passing through the Home Agent.

When away from home, Mobile IP uses protocol tunnelling to hide a Mobile Node's home address from intervening routers between its home network and its current location. The tunnel terminates at the Mobile Node's care-of address. The care-of address must be an address to which datagrams can be delivered via conventional IP routing. At the care-of address, the original datagram is removed from the tunnel and delivered to the Mobile Node.

There are several problems still being addressed with systems employing current Mobile IP methods. In order to provide Mobile IP service to a Mobile Node, the Home Agent has to accept the Mobile IP registration request, validate it and return the Mobile IP registration reply to the Mobile Node indicating that either the Home Agent accepts or refuses to offer the Mobile IP service. Thus it can be seen that in order to ensure reliable Mobile IP service requires ensuring a reliable Home Agent.

One way to address this problem is to provide several Home Agents and distribute the number of registered Mobile Nodes between these Home Agents. In order to distribute the Mobile Nodes among the Home Agents, the network operator has to statically pre-assign a number of Mobile Nodes to a specific Home Agent. Since a Home Agent is statically pre-assigned to a number of Mobile Nodes by the network operator, no measures are taken to ensure that the traffic load handled by the Home Agent is balanced between the different Home Agents.

Considering that, managing all the Mobile Nodes and Home Agents pre-assigned proves to be an onerous task. It is difficult to manage all the Mobile Nodes in a large network by pre-assigning Mobile Nodes to a specific Home Agent and it won't guarantee that the Mobile Nodes will be evenly registered among the Home Agents. One way to evenly distribute these Home Agents is by balancing the load between them. In order to distribute the Mobile Nodes optimally between the different Home Agents, the load information of each Home Agent on the network should be shared between them. Currently there is no mechanism that allows sharing this load information of each Home Agent with the other Home Agents.

In addition to the above problem, another problem exists when deploying multiple Home Agents with redundancy. Current systems which provide redundancy do so using hardware. However, some platforms on which Home Agent functionality will be implemented don't provide hardware redundancy. In case of failure of the Home Agent in those systems the Mobile IP service will be interrupted until the failed Home Agent recovers. In addition, even in the systems providing hardware redundancy there exist no measures to ensure redundancy for the Home Agent if the hardware redundancy is not available.

SUMMARY OF THE INVENTION

The present invention relates to data communications in packet switched networks and more specifically to the mobility of terminals in networks implementing the Mobile Internet Protocol (MIP).

As can be seen above, there still exists disadvantages with current Mobile IP systems. Current systems typically deploy several Home Agents and provide for some level of redundancy among those Home Agents. The Mobile Nodes in the network are then distributed among these Home Agents.

Because the Home Agents are statically pre-assigned to a number of Mobile Nodes by the network operator, no measures are taken to ensure that the traffic load handled by the Home Agents is balanced between the different Home Agents.

In addition, the Mobile IP systems which provide for redundancy do so using hardware. No measures exist to ensure redundancy for failure in the assigned Home Agent if hardware redundancy is not available.

Accordingly, an object of the present invention is to solve or at least minimize the problems associated with the prior art IP mobility mechanisms. The object is achieved with a method which is characterized by what is disclosed in the attached independent claims. Preferred embodiments of the invention are disclosed in the attached dependent claims.

The present invention is designed to work in a packet switched network implementing mobility over the Internet, as exemplified by systems using the Mobile Internet Protocol ("MIP"). The network will have a number of Mobile Nodes attached to the network. Each Mobile Node will have an IP address and be attached to the network through a Home Agent. When visiting another network a Mobile Node will register with that network through a Foreign Agent. The network will provide a number of Home Agents through which the Mobile Node may register, although the Mobile Node will be statically configured to register with a given Home Agent.

In the method according to the present invention each Home Agent will store locally the load information from other Home Agents and will use load information and load information acknowledge messages to exchange load information with the other Home Agents.

The Mobile Node will send a Registration Request to the Foreign Agent with the statically configured address of its primary Home Agent. The Foreign Agent then forwards the request to this primary Home Agent. In certain situation the request for registration will not be completed due to e.g. failure of the primary Home Agent or where the network chooses balance the load on the network by registering the Mobile Node with another Home Agent having a lower load.

The Mobile Node then sends a Registration Request to the Foreign Agent with the address of a second, alternate, Home Agent. The Foreign Agent then forwards this request to the alternate Home Agent. If the alternate Home Agent accepts the request then it sends a reply to the Mobile Node and sets up a new mobility binding and establishes a tunnel between the Foreign Agent and second Home Agent.

There are two methods provided in the present invention to solve the two situations where the Mobile Node fails to register with its primary Home Agent. These problems occur more frequently in present systems, as discussed above, due to problems of hardware-only redundancy and lack of load balancing among Home Agents. The present invention suggests a method using Mobile IP Home Agent Load Balancing whereby a balanced distribution of Mobile Nodes among Home Agents is achieved.

The present invention also addresses the problems with hardware redundancy by providing for software redundancy to allow users to benefit from Mobile IP services even when a HA experiences failure. Two alternatives are proposed. According to a first solution an additional Mobile IP extension is added to the registration reply message which allows the Mobile Node to select, among those listed in the Mobile IP extension, a new secondary Home Agent to perform registration with in case the primary Home Agent fails. According to a second solution, a dedicated hot standby or shared redundancy Home Agent is called upon. The proposed solution, via the Home Agent software redundancy, thus allows for continuous Mobile IP services in case of Home Agent failure, even when the Home Agent platform does not provide hardware redundancy.

The present invention is not discussed in terms of any particular system. It is particularly applicable to applications in e.g. cellular, satellite, wireless local area networks (WLAN's). However, it is not limited to these systems and may, in general, be used in any system which implements the Mobile IP having Mobile Nodes, Home Agents and Foreign Agents. Although the invention has been summarised above, the present invention is defined according to appended claims 1, 25, 26 and 27. Various embodiments are further defined in the dependent claims.

BRIEF DESCRIPTION OF THE DRAWINGS

The present invention will now be described in more detail with reference to preferred embodiments of the present invention, given only by way of example, and illustrated in the accompanying drawings, in which.

DETAILED DESCRIPTION

The present invention is designed to work in a packet switched network implementing mobility over the Internet, as exemplified by systems using the Mobile Internet Protocol ("MIP"). The network will have a number of Mobile Nodes ("MN") attached to the network. Each MN will have an IP address and be attached to the network through a Home Agent ("HA"). When visiting another network a MN will register with that network through a Foreign Agent ("FA"). The network will provide a number of Home Agents through which the MN may register, although the MN will be statically configured to primarily register with a given HA.

Figure 1:
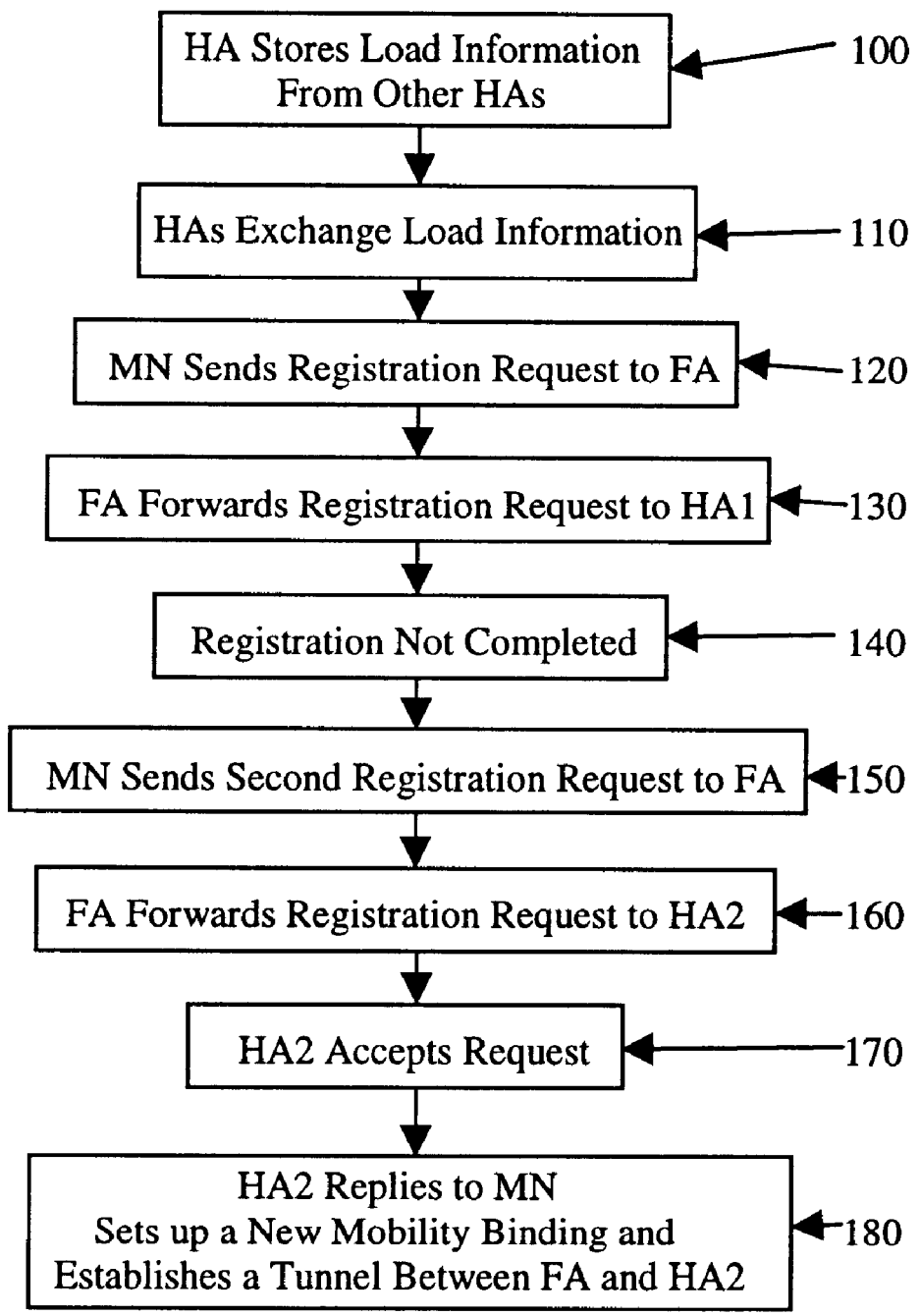
FIG. 1 is a flowchart indicating the steps of the method according to the present invention.

The basic steps of the method according to the present invention are illustrated in FIG. 1. First, each Home Agent ("HA") will store locally 100 the load information from other HAs and will use HA load information and load information acknowledge messages to exchange load information 110 using a Load Information Acknowledgement with the other HAs. This distributes the information among all the HAs and has the advantage over storing the information in one place, e.g. centrally, that when one HA fails the information will be available in all the other HAs.

The MN then sends a Registration Request 120 to the FA with the statically configured HA address, e.g. HA1. This may be initiated by the MN or in response to advertisements. Mobility agents (i.e., Foreign Agents and Home Agents) typically advertise their presence via Agent Advertisement messages. A MN may optionally solicit an Agent Advertisement message from any locally attached mobility agents through an Agent Solicitation message. A MN receives these Agent Advertisements and determines whether it is on its home network or a foreign network.

The FA forwards 130 the request to HA1. The request for registration is not completed 140 at HA1. This may be due to e.g. failure of HA1 or where the network is implemented to balance the load between the HAs and does so by having the MN register with another HA which has a lower load than HA1. The MN then sends a Registration Request 150 to the FA with the address of a second, alternate, HA, in this case HA2. The FA forwards 160 this request to HA2. If HA2 accepts 170 the request then it sends a reply 180 to the MN and sets up a new mobility binding and establishes a tunnel between the FA and HA2.

As indicated above, the MN is statically configured to attempt to register with a given HA, HA1. If, for some reason, the registration cannot be completed, then the MN will attempt to register with another HA in the network, e.g. HA2. The present invention addresses two situations where the registration will not be completed. The first situation occurs when the network attempts to balance the load between the different HAs and chooses to have the MN register with an HA having a lower load. This is referred to as Load Balancing. The second situation addressed by the present invention is where the statically configured HA, HA1, fails, and the network provides other redundant HAs with which the MN can register. This is referred to as Software Redundancy.

The first situation for choosing a second HA in the present invention is Home Agent Load Balancing. This will allow the network operator to distribute Mobile Nodes ("MN") among installed HAs on the network. There are two methods of performing load balancing: static load balancing and dynamic load balancing. Static load balancing is typically performed manually by the network operator who distributes Mobile Nodes among the HAs. Each MN will be assigned statically to a specific HA and will also determine the number of Mobile Nodes per HA. This method is designed for situations with a limited number of Mobile Nodes, e.g. corporate networks.

The present invention addresses the situation by using dynamic load balancing in contrast to static load balancing. The basic idea is to share the load information between all the installed HAs on the network in order to dynamically distribute the Mobile Node among these HAs. The load information could be the number of mobility bindings (i.e. the number of registered Mobile Nodes) and/or the CPU usage on the HA. The HAs are given all HA IP addresses on the network, which they store locally, and they use new messages to exchange load information with the other HAs.

New Mobile IP messages will need to be defined and used to transfer information between the HAs. Each HA will store locally the load information from other HAs, 205 in FIG. 2, and will use the HA load information and load information acknowledge messages to exchange load information using a Load Information Acknowledgement, 210 in FIG. 2, with the other HAs.

Figure 2:
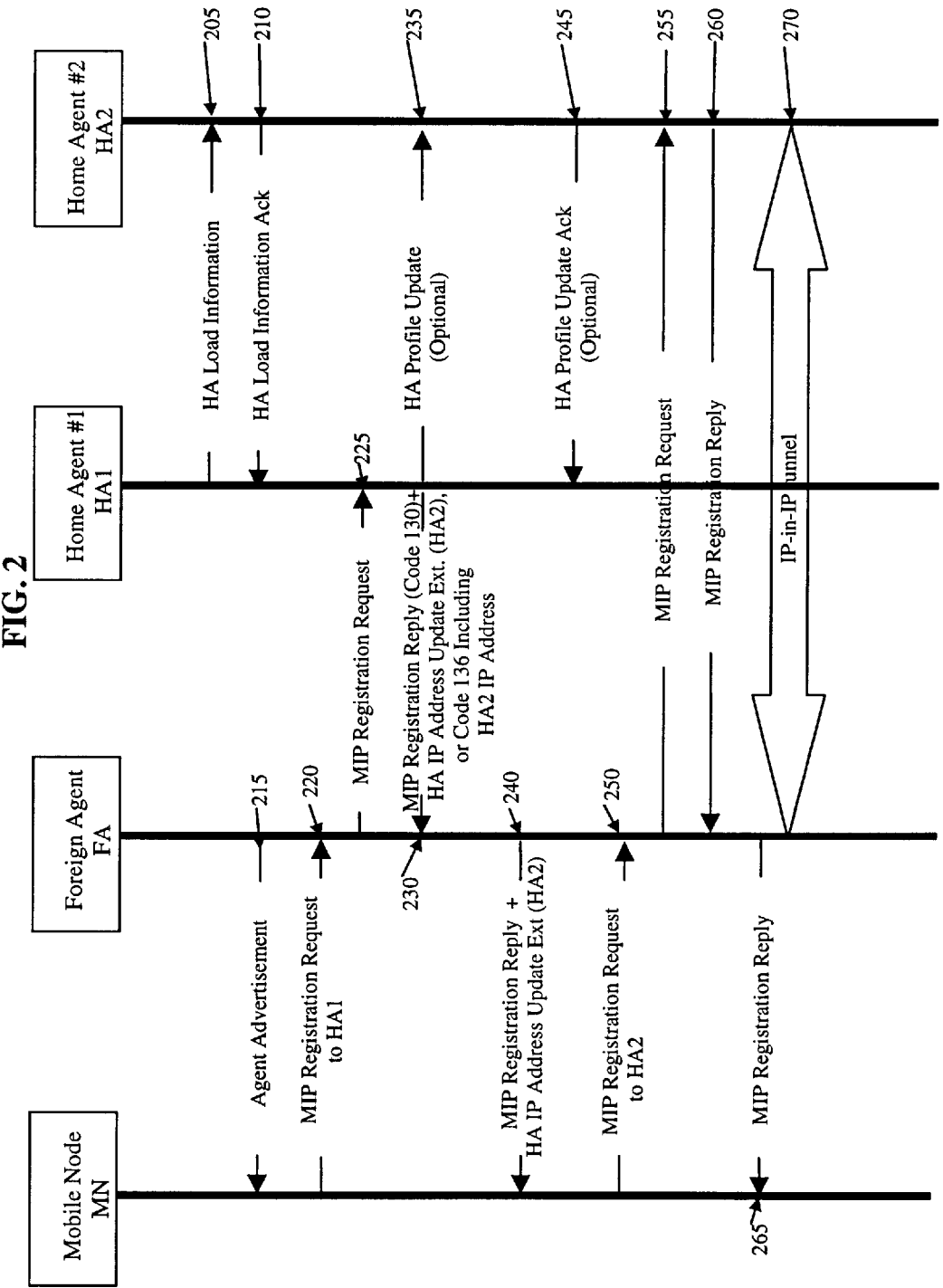
FIG. 2 is a flowchart illustrating the flow of messages for the method of Simple Dynamic Load Balancing.

The steps of the method are illustrated in FIG. 2. First the MN receives an agent advertisement 215 from the Foreign Agent ("FA"). It sends the Mobile IP Registration Request ("RRQ") 220 with the statically configured HA address. The FA forwards the Mobile IP RRQ 225 to the configured HA, Home Agent #1 ("HA1").

HA1 will look in its local HA load information table to find a HA where the load is less than its own. If it finds one that is less busy then it will return 230 a Mobile IP Registration Reply ("RRP") with error code 130 (Insufficient resources) including a new Mobile IP extension, or alternately using error code 136 including the address of the second Home Agent HA2. The new Mobile IP extension will have a HA IP Address Update with the address of the second Home Agent ("HA2").

HA1 could also optionally send 235 a HA Profile Update message to HA2 in order to add statically the Mobile Node profile when the Mobile Node's profile is not stored in the common Authentication, Authorization and Accounting ("AAA") node. In this case HA2 would acknowledge 245 the update to HA1.

After receiving the RRP from HA1, FA forwards 240 it to the MN. The MN now receives the Mobile IP RRP with error code 130 and the new Mobile IP HA IP Address Update extension with the address of HA2 or with error code 136 including the address of HA2. It will then use HA2's address specified in the extension or the registration reply (error code 136) to send 250 a new Mobile IP RRQ. The FA forwards 255 this new Mobile IP RRQ to HA2.

HA2 will then process the Mobile IP RRQ (authenticate and validate MN) and will accept or reject the Mobile IP RRQ. If HA accepts the Mobile IP RRQ, it will add a new mobility binding, establish a tunnel 270 between the FA and HA and sends 260 the Mobile IP RRP with error code 0. The FA forwards the Mobile IP RRP to the MN. The MN receives 265 the Mobile IP RRP with error code 0 from the FA, indicating that it is registered and can use the Mobile IP service. The MN will then use HA2 as its current HA for re-registration.

Figure 3:
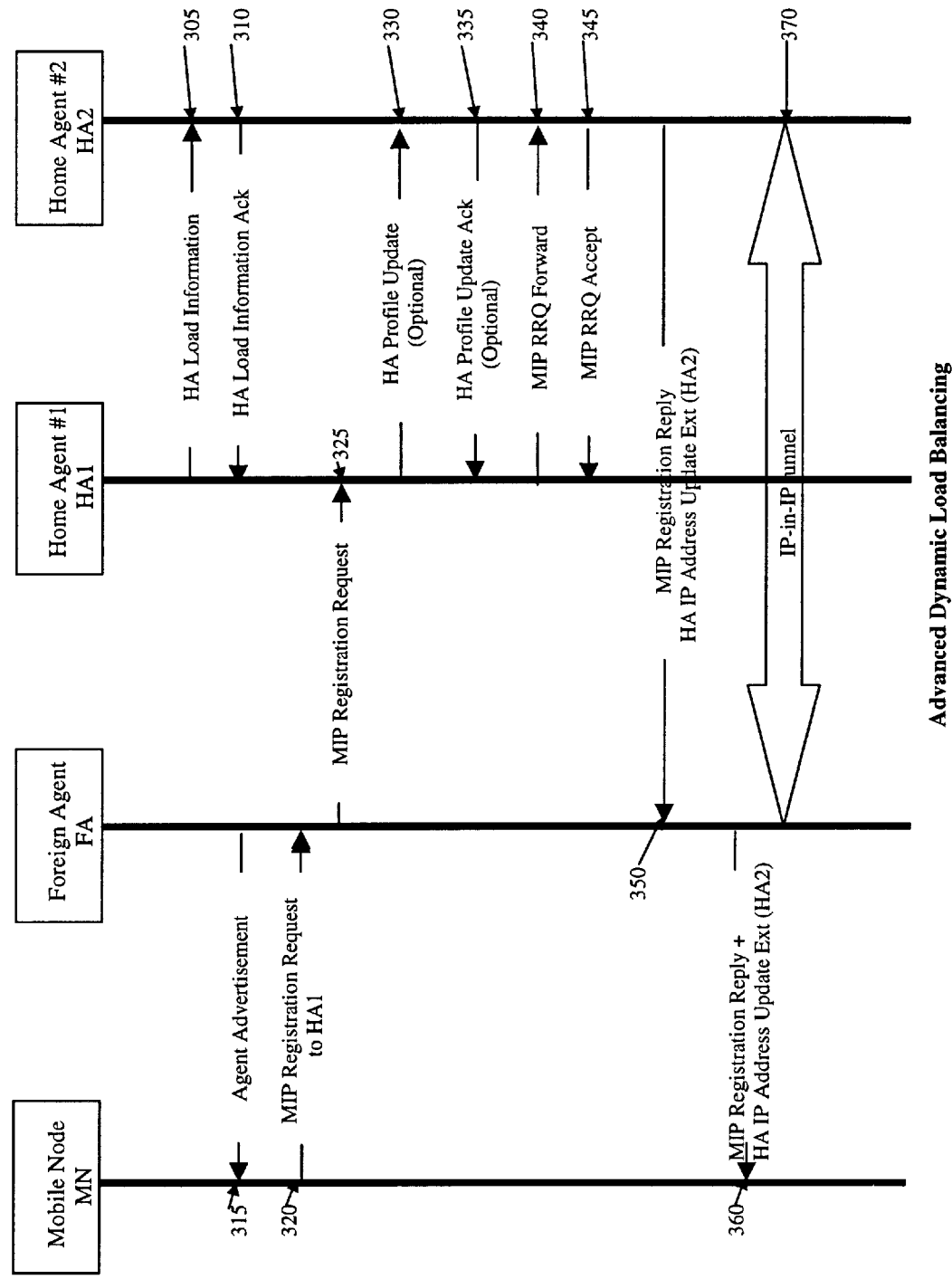
FIG. 3 is a flowchart illustrating the flow of messages for the method of Advanced Dynamic Load Balancing.

In the second embodiment, Advanced dynamic load balancing, each HA will store locally the load information from other HAs, 305 in FIG. 3, and will use the HA load information and load information acknowledge messages to exchange load information using a Load Information Acknowledgement, 310 in FIG. 3, with the other HAs.

The steps of the method are illustrated in FIG. 3. First, the MN receives 315 an agent advertisement from the FA. It sends 320 the Mobile IP RRQ with the statically configured HA address. The FA then forwards 325 the Mobile IP RRQ to the configured HA, HA1. HA1 will look in its local HA load information table to find a HA where the load is less than its own. If it finds one that is less busy, e.g. HA2, then it will forward 340 the Mobile IP RRQ to that HA, HA2, using the HA Mobile IP RRQ Forward message.

HA1 could also optionally send 330 a HA Profile Update message to HA2 in order to add statically the Mobile Node profile when the Mobile Node's profile is not stored in the common Authentication, Authorization and Accounting ("AAA") node. In this case HA2 would acknowledge 335 the update to HA1.

HA2 will reply 345 with the HA Mobile IP RRQ Accept message to HA1, indicating that it will process the Mobile Node RRQ. HA2 will process the Mobile IP RRQ (authenticate and validate the Mobile Node) and will accept or reject the Mobile IP RRQ. If HA accepts the Mobile IP RRQ, it will add a new mobility binding, establish a tunnel 370 between the FA and HA2 and send 350 the Mobile IP RRP with code 0 including the new Mobile IP HA IP Address Update extension containing its own IP address.

The FA forwards 360 the Mobile IP RRP from HA2 to the MN. The MN receives the Mobile IP RRP with error code 0 and the new Mobile IP HA IP Address Update extension indicating that it is registered with the new HA and it can use the Mobile IP service. The MN will then use HA2 as its current HA for re-registration.

The second situation for choosing a second HA in the present invention is HA redundancy. The best solution for Home Agent redundancy is a hardware redundancy. However, sometimes hardware redundancy is not available because it isn't implemented or the hardware redundancies have also failed. If hardware redundancy is not available then there are software workarounds provided in the present invention that provide redundancy to the Home Agent. The complexity of software redundancy will increase depending on the level of redundancy supported. Software redundancy won't prevent service interruption but will minimize the service interruption time.

The simplest software redundancy will use existing Mobile IP error codes from the FA to inform the MN that the current HA is no longer available and that it should connect to an alternate HA. A static Home Agent configuration is the simplest implementation for selecting a Home Agent in case of failure of the primary Home Agent. It requires modifications in the MN Mobile IP application but does not require any modification on the FA and HA. Static HA configuration is the current method used for selecting an alternate HA in case of failure.

The two alternative embodiments according to the present invention by which to perform software redundancy are: (1) Mobile IP Secondary Home Agent and (2) Mobile IP Home Agent Change Indication. These different embodiments use similar mechanisms and messages and can be used with a dedicated hot standby HA or with all operating HAs on the network.

The first method of performing simple software redundancy, a Mobile IP Secondary Home Agent, adds a new Mobile IP extension. This is a Secondary HA Extension (indicating the list of available HAs on the network) in the Mobile IP registration reply from the HA. This needs additional support in the FA and MN implementations.

In this embodiment the MN is only configured with a primary HA. The MN uses small registration lifetime in order to detect HA failure quickly and the HAs will need to share the Mobile Node profiles if it is not stored in the AAA node.

Figure 4:
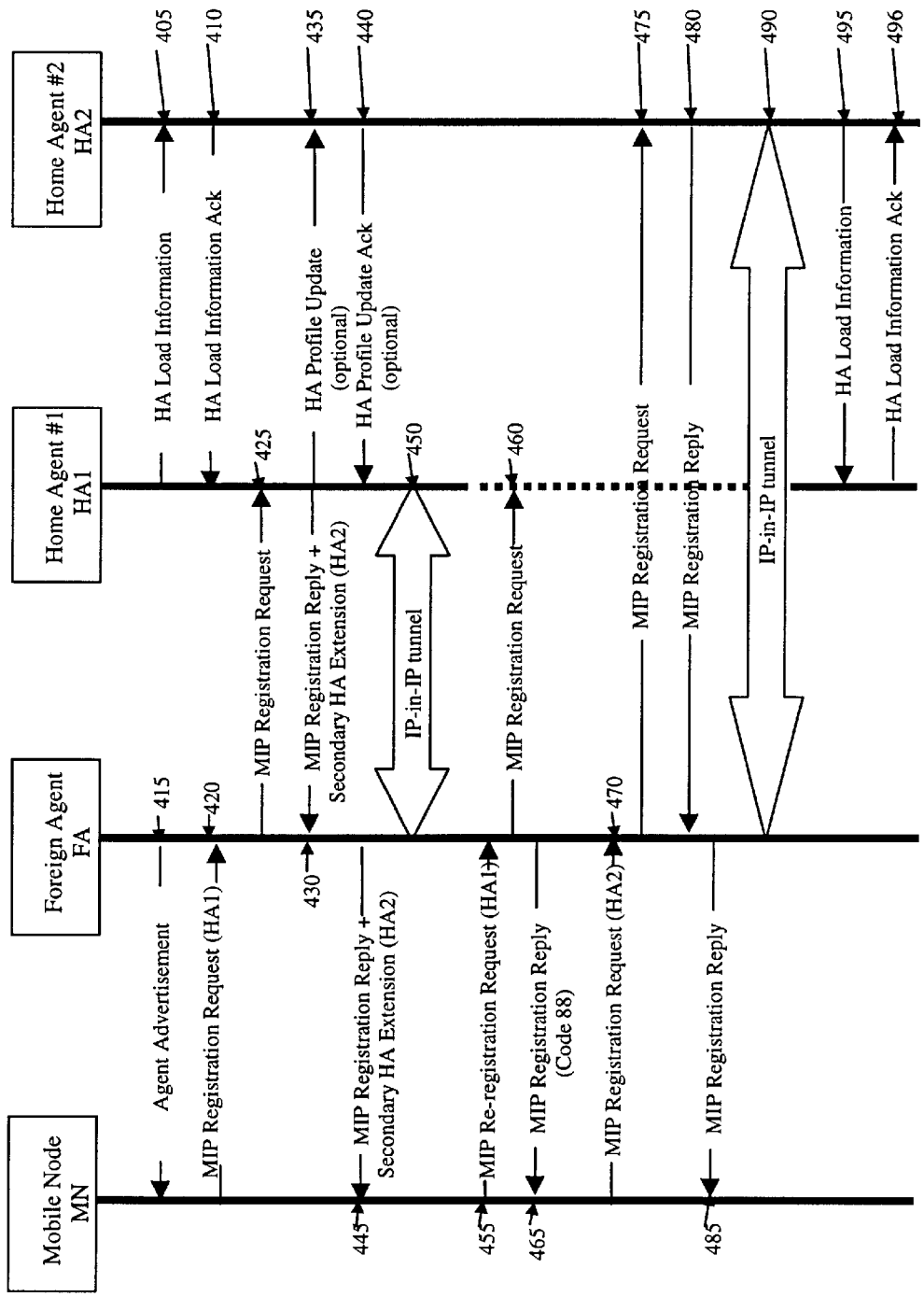
FIG. 4 is a flowchart illustrating the flow of messages for the method of Software Redundancy by Mobile IP Secondary Home Agent Extension.

The steps of the method are illustrated in FIG. 4. Each HA will store locally 405 the load information from other HAs and will use the HA load information and load information acknowledge messages to exchange load information 410 using a Load Information Acknowledgement with the other HAs.

The MN receives 415 an agent advertisement from the FA. It sends 420 the Mobile IP RRQ with the statically configured primary HA, HA1, address. The FA then forwards 425 the Mobile IP RRQ to HA1. HA1 will process the Mobile IP RRQ (authenticate and validate the Mobile Node) and will accept or reject the Mobile IP RRQ. If HA1 accepts the Mobile IP RRQ, it will add a new mobility binding, establish a tunnel 450 between the FA and HA and send 430 the Mobile IP RRP with code 0. In contrast with the previous embodiment the RRP will now include the new Mobile IP Alternate HA extension containing alternate HA IP addresses, here with the IP address of HA2.

HA1 could also optionally send 435 a HA Profile Update message to HA2 in order to statically add the Mobile Node profile when the Mobile Node's profile is not stored in the common AAA node. In this option HA2 would also acknowledge 440 the update to HA1.

The FA forwards 445 the Mobile IP RRP from HA1 to the MN. The MN receives the Mobile IP RRP with error code 0 and the new Mobile IP Alternate HA extension indicating that it is registered with the primary HA and it stores the list of alternate HAs for redundancy support. The MN can now use the Mobile IP service.

The MN then sends 455 a Re-registration Request to HA1 which is forwarded 360 to HA1 by the FA. In the situation indicated by the dotted line, the primary HA fails. If the primary HA, here HA1, fails, the FA will return 465 a Mobile IP RRP with one of the following error codes: 80 (Home network unreachable, not shown in FIG. 4), 81 (Home agent host unreachable, not shown in Figure), or 88 (Home agent unreachable, shown here in FIG. 4) to the MN.

The MN then uses one of the configured alternate HAs, here HA2, in its next RRQ 470. This RRQ is forwarded 475 by the FA to HA2. HA2 processes the RRQ, i.e. authenticates and validates the MN, and will accept or reject it. If HA2 accepts it will add a new mobility binding, establish a tunnel 490 between the FA and HA2, and send 480 the RRP to the FA which forwards 485 it to the MN.

If Mobile IP registration is successful the MN will then use HA2 as its current HA for re-registration. Also, it should be noted that if the primary HA is already failed at the first Mobile IP registration request, the Mobile Nodes won't be able to connect until the primary HA is up.

In order to implement the above embodiment a Mobile IP Secondary HA Extension will need to be added and the MN, FA and HAs should be able to process it. In addition, the HAs will need to share Mobile Node profiles if these are not stored in the AAA node.

The second embodiment used to implement software HA redundancy is called Mobile IP secondary HA extension. It allows a dedicated hot standby or shared redundancy HA on the network to automatically notify the MN that its primary HA has failed. The redundant HA will send Mobile IP registration replies, including the Mobile IP Home Agent change indication extension, to all Mobile Nodes which were registered to the failed HA. This extension will contain the new HA IP address that the MN will use to register to request Mobile IP service. This extension will require additional support in the FA and MN implementations.

In this embodiment, the MN is only configured with a primary HA and the HAs will need to share the Mobile Node profiles if they are not stored in the AAA node. If a dedicated hot standby is used, the primary HA will periodically send a load information message to the dedicated hot standby HA or all shared redundancy HAs on the network.

Figure 5:
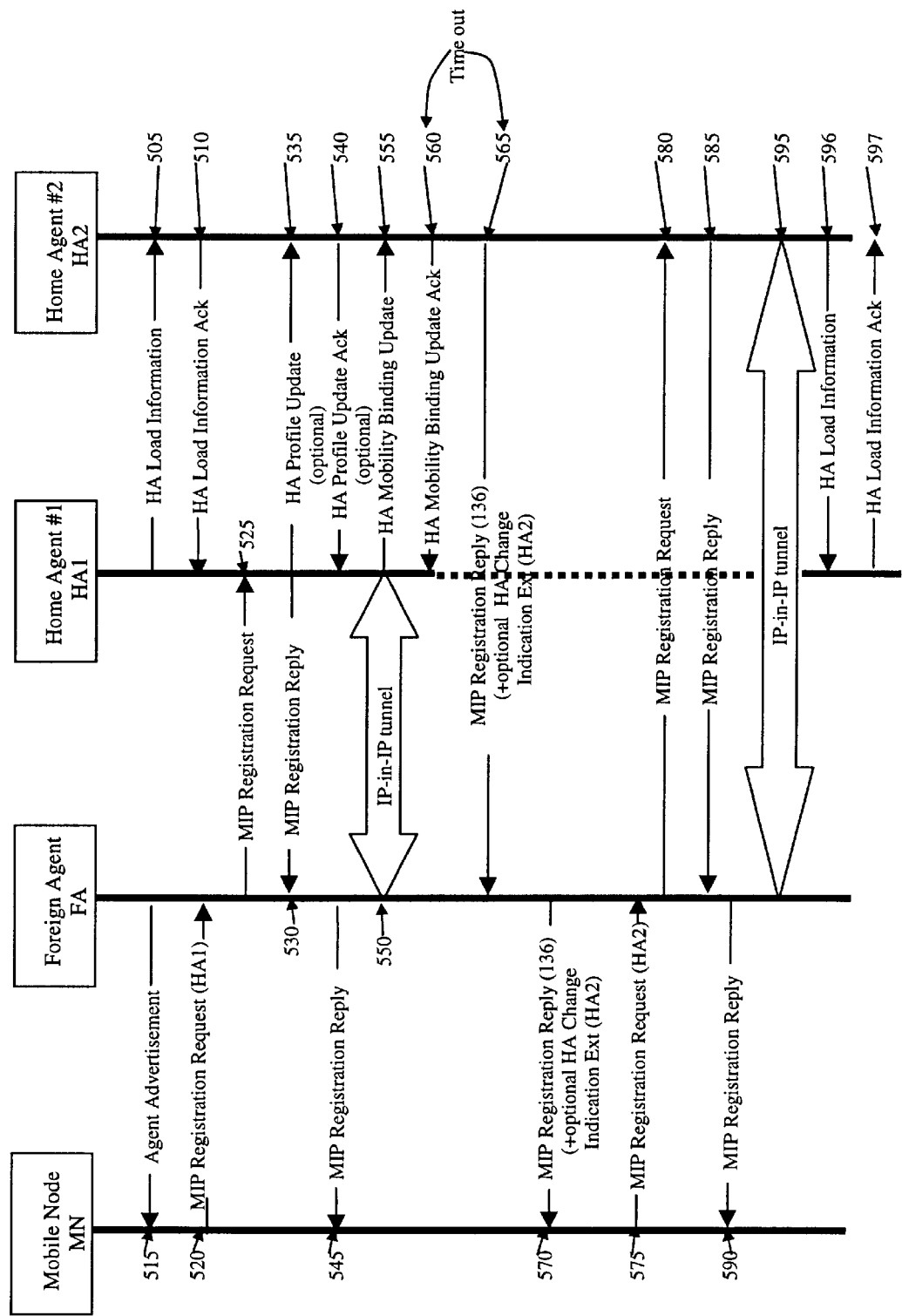
FIG. 5 is a flowchart illustrating the flow of messages for the method of Software Redundancy by Mobile IP Home Agent Change Indication Extension.

The steps of the method are illustrated in FIG. 5. Each HA will store locally 505 the load information from other HAs and will use the HA load information and load information acknowledge messages to exchange load information 510 using a Load Information Acknowledgement with the other HAs. The Mobile Node receives 515 an agent advertisement from the FA. It sends 520 the Mobile IP RRQ with the statically configured primary HA address.

The FA then forwards 525 the Mobile IP RRQ to the configured primary HA, HA1. HA1 will process the Mobile IP RRQ (authenticate and validate the Mobile Node) and will accept or reject the Mobile IP RRQ. If HA1 accepts the Mobile IP RRQ, it will add a new mobility binding, establish a tunnel 550 between the FA and HA1 and sends the Mobile IP RRP with code 0. It could also send HA profile update messages to the redundancy HA.

HA1 could also optionally send 535 a HA Profile Update message to HA2 in order to statically add the Mobile Node profile when the Mobile Node's profile is not stored in the common AAA node. In this option HA2 would also acknowledge 540 the update to HA1.

HA1 will send 555 the HA mobility binding update message to the redundancy HA, HA2, to indicate that the MN has registered. HA2 will then acknowledge 560 this update to HA1.

The FA forwards 545 the Mobile IP RRP from HA1 to the MN. The MN receives the Mobile IP RRP with error code indicating that it is registered with the HA1. The MN can now use the Mobile IP service.

In the situation indicated by the dotted line the primary HA, here HA1, fails. HA2 does not received the HA load information message for the specified time then it will send 565 a Mobile IP RRP with code 136 (Unknown HA address). This will include the HA change indication extension to all Mobile Nodes that were registered to HA1 or can use the HA IP address field in the RRP to indicate the IP address for HA2.

The FA will forward 570 the Mobile IP RRP with error code 136 (Unknown HA address) to the MN. On reception of the Mobile IP RRP with the HA change indication extensions, the MN will use the specified IP address in the HA change indication extension in its next Mobile IP RRQ 575. This RRQ is forwarded 580 by the FA to HA2. HA2 processes the RRQ (authenticates and validates the MN) and will accept or reject it. If HA2 accepts it will add a new mobility binding, establish a tunnel 595 between the FA and HA2, and send 585 an RRP to the FA which will forwarded it 590 to the MN. If Mobile IP registration is successful, the Mobile Node will then use the redundancy HA as its current HA for re-registration. It should also be noted that if the primary HA is already failed at the first Mobile IP registration request the Mobile Nodes won't be able to connect until the primary HA is up.

In order to implement the above embodiment a Mobile IP HA Change Extension can be added and the MN, FA and HAs should be able to process it. In addition, the HAs will need to share Mobile Node profiles if these are not stored in the AAA node. When a Mobile IP RRP is received from the FA with the error code 136, the MN should be able to use the HA IP address specified in the extension, or in the HA IP address field of the Mobile IP RRP, in its next Mobile IP RRQ. The primary HA will also need to send HA mobility binding update message to the redundancy HA.

The Mobile IP Home Agent change indication embodiment of FIG. 5 will also allow a dedicated hot standby or shared redundancy HA on the network to automatically notify the MN that its primary HA has failed. Using a dedicated hot standby redundancy HA will require a second dedicated HA installed to replace the primary HA. The working HA is the primary and the second dedicated machine is the redundancy HA.

The primary HA will always update the secondary HA using new MIP messages (mobility bindings, profiles, tunnel update messages) whereas the secondary HA will keep all existing local Mobile Node profiles, active mobility bindings and tunnels on the primary HA.

The HA redundancy will periodically send the Home Agent Load Information Message from the primary HA to the dedicated secondary HA indicating that it is still active. When the primary HA stops sending the HA Load Information Messages for a configurable time interval, the dedicated secondary HA becomes the primary HA.

It will also send to all registered Mobile Nodes an indication that the previous HA is not active and they should use the new primary as the new primary HA. The new primary HA will start sending HA Load Information to the previous primary HA. When the previous primary HA comes back to the network, it will start-up as the dedicated secondary HA.

When implementing using shared redundancy HAs existing HAs on the network will be used to re-establish MIP sessions from the failed HA. The Home Agent Redundancy is based on primary/secondary concept; the default HA is the primary HA and all the other on the network are secondary HAs. The HA redundancy feature will use the periodic multicast or unicast messages to send Home Agent Load Information Message from the primary HA to all secondary HAs indicating that it is still active.

When the primary HA stops sending the HA Load Information Messages for a configurable time interval, the next secondary HA becomes the primary HA. The new primary will change its ranking to 1 and will start sending HA Load Information to the other HAs. When the previous primary HA comes back to the network, it will startup as the lowest HA and send the HA ranking request message to update its local HA table.

The embodiments described above serve merely as illustration and not as limitation. It will be apparent to one of ordinary skill in the art that departures may be made from the embodiments described above without departing form the spirit and scope of the invention. The invention should not be regarded as being limited to the examples described, but should be regarded instead as being equal in scope to the following claims.

What is claimed is:

1. A method for providing Mobile Internet Protocol ("MIP") mobility service for a Mobile Node ("MN") in a packet switched network comprising a plurality of Home Agents ("HA") and at least one Foreign Agent ("FA"), the MN, the FA, and each HA having an IP address, the method being characterized by:

each HA storing load information from other HAs in the network;
   each HA exchanging load information with other HAs in the network;
   the MN sending a registration request to the FA;
   the FA forwarding the second registration request to a first Home Agent HA1;
   incompletion of the registration;
   the MN sending a second registration request to the FA;
   the FA forwarding the second registration request to a second Home Agent HA2;
   HA2 accepting the second request; and
   HA2 establishing a connection with the MN.

2. The method of claim 1 further characterized wherein wherein the exchange of load information is performed using Load Information messages and Load Information Acknowledgement messages.

3. The method of claim 1 further characterized wherein the registration request is sent in response an advertisement from a Foreign Agent.

4. The method of claim 3 further characterized wherein the advertisement is sent in response to an Advertisement Solicitation from the MN.

5. The method of claim 1 further characterized wherein the load information comprises either the number of mobility bindings or the CPU usage on a HA, or both.

6. The method of claim 1 further characterized wherein the second Home Agent HA2 is chosen for registration based on the load balance between all the HAs in the network.

7. The method of claim 6 further characterized wherein HA1 looking in its locally stored HA load information to find a HA which has a load less than its own;
   if it finds one that is less busy then returning a MIP registration reply ("RRP") with the address of HA2 and an error code;
   the MN sending a new registration request to the FA, addressed to HA2;
   the FA forwarding the new request to HA2;
   HA2 processing the new request by authenticating and validating the MN and either accepting or rejecting the new request;
   in the case of HA2 accepting the request, adding a new mobility binding and establishing a tunnel between the FA and HA2;
   HA2 replying to FA with error code 0;
   FA forwarding the reply to MN; and
   the MN receiving the reply with error code 0 indicating it is registered with HA2 and can use an MIP service.

8. The method of claim 7 further characterized wherein the RRP has a new Mobile IP Address Update Extension for transmitting the address of HA2.

9. The method of claim 7 further characterized wherein the error code transmitted in the RRP is error code 130 indicating insufficient resources.

10. The method of claim 7 further characterized wherein the error code transmitted in the RRP is error code 136 indicating an unknown HA address.

11. The method of claim 7 further characterized wherein HA1 also sending a HA Profile Update message to HA2 when the MN profile is not stored in a common Authentication, Authorization and Accounting no de.

12. The method of claim 6 further characterized wherein HA1 looking in its locally stored HA load information to find a HA which has a load less than its own;
   in the case of finding an HA, HA2 that is less busy, then forwarding the request to HA2
   HA2 accepting the request and notifying HA1 that it will process the request;
   HA2 processing the request and accepting or rejecting the request;
   in the case of HA2 accepting the request, adding a new mobility binding, establishing a tunnel between the FA and HA2, and sending a MIP registration reply (RRP) including its own IP address;
   FA forwarding the reply to the MN; and
   MN receiving the reply with error code 0 and the IP address for HA2 indicating that it is now registered with HA2 and can use a MIP service.

13. The method of claim 12 further characterized wherein HA1 also sending a HA Profile Update message to HA2 when the MN profile is not stored in a common Authentication, Authorization and Accounting node.

14. The method of claim 12 further characterized wherein the RRP has a new Mobile IP Address Update Extension for transmitting the address of HA2.

15. The method of claim 1 further characterized wherein the second Home Agent HA2 is chosen for registration based on failure to register with HA1.

16. The method of claim 15 further characterized wherein HA1 processing the request by authenticating and validating the MN and will accept or reject the request;
   in the case of HA1 accepting the request, adding a new mobility binding, establishing a tunnel between the FA and HA1 and sending a reply with code 0, including the IP address of HA2;
   the FA forwarding the reply to the MN;
   HA1 failing;
   the MN attempting to re-register with HA1;
   the FA returning a reply to the MN with an error code indicative of failure to register with HA1;
   the MN sending a request to HA2;
   the FA forwarding the request to HA2;
   HA2 processing the request and either accepting or rejecting the request;
   in the case HA2 of accepting the request then adding a new mobility binding, establishing a tunnel between the FA and HA2 and sending a reply;
   the FA forwarding the reply from HA2 to the MN; and
   the MN consequently using MIP services.

17. The method of claim 16 further characterized wherein the reply with code 0 includes a Mobile IP Alternate HA extension containing alternate HA IP addresses, including the address of HA2.

18. The method of claim 16 further characterized wherein HA1 also sending a HA Profile Update message to HA2 when the MN profile is not stored in a common Authentication, Authorization and Accounting node.

19. The method of claim 16 further characterized wherein the error code indicating a failure to register with HA1 includes at least one of the following: error code 80 indicating the home network is not reachable, error code 81 indicating the HA host is not reachable, and error code 88 indicating the HA is not reachable.

20. The method of claim 15 further characterized wherein HA1 processing the request by authenticating and validating the MN and either accepting or rejecting the request;

in the case of HA1 accepting the request, adding a new mobility binding, establishing a tunnel between the FA and HA1 and sending a reply with code 0;

the FA forwarding the reply to the MN;

HA1 sending a Home Agent Mobility Binding Update message to HA2 to indicate that MN is registered with HA1;

HA2 sending an acknowledgement to HA1, acknowledging receipt of the Update;

HA1 failing;

after a specified time, HA2 failing to receive an HA Load Information message from HA1;

in response to said failure, HA2 sending a registration reply with code 136 (Unknown HA address) to all MNs registered with HA1, the registration reply including the IP address for HA2;

the FA forwarding the reply to the MN;

MN sending a request to HA2;

the FA forwarding the request to HA2;

HA2 processing the request and either accepting or rejecting the request;

in the case of HA2 accepting the request, adding a new mobility binding, establishing a tunnel between the FA and HA2 and sending a reply;

the FA forwarding the reply from HA2 to the MN; and the MN consequently using the MIP service.

21. The method of claim 20 further characterized wherein HA1 also sending a HA Profile Update message to HA2 when the MN profile is not stored in a common Authentication, Authorization and Accounting node.

22. The method of claim 20 further characterized wherein HA1 has a dedicated secondary HA which automatically notifies the MN when its primary HA, HA1, fails.

23. The method of claim 22 further characterized wherein HA2 is the dedicated secondary HA.

24. The method of claim 22 further characterized wherein HA1 periodically sending load information to the dedicated secondary HA; and if the dedicated secondary HA fails to receive load information from HA1 after a preconfigured time interval, the dedicated secondary HA becomes the MN's primary HA.

25. A packet switched network for implementing a Mobile Internet Protocol ("MIP") mobility service having a Mobile Node ("MN"), a plurality of Home Agents ("HA") and at least one Foreign Agent ("FA"), the MN, the FA, and each HA having an IP address, the network comprising:

information storing means for storing load information in each HA from other HAs in the network;

information exchanging means in each HA for exchanging load information with other HAs in the network;

requesting means in the MN for sending registration requests to the FA;

forwarding means in the FA for forwarding registration requests to Home Agents HAs;

determining means for determining the completion of the registration based on one of the requests;

accepting means in each HA for accepting one of the requests;

connection means in each HA for establishing a connection with the MN.

26. A computer program product directly loadable into the internal memory of a digital computer, comprising software code portions for performing the steps of claim 1 when said product is run on a computer.

27. A computer program product stored on a computer usable medium, comprising readable program means for causing a computer to control the execution of the steps of claim 1.

* * * * *